US 6,279,074 B1

(54) CONTENTION HANDLING FOR TASK REQUESTS TO STORAGE DEVICES WITHIN A HOST SYSTEM

(75) Inventor: Jerry Wayne Pence, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/088,347

(22) Filed: Jun. 1, 1998

(51) Int. Cl.$^7$ .................................................. G06F 12/00
(52) U.S. Cl. ........................................... 711/112; 711/151
(58) Field of Search .................................... 711/112, 117, 711/151; 364/200, 650, 425

(56) References Cited

U.S. PATENT DOCUMENTS

| | | | |
|---|---|---|---|
| 4,638,424 | * | 1/1987 | Beglin et al. ........................ 711/117 |
| 4,771,375 | | 9/1988 | Beglin et al. . |
| 5,140,683 | * | 8/1992 | Gallo et al. ........................ 711/117 |
| 5,239,649 | | 8/1993 | McBride et al. . |
| 5,325,505 | | 6/1994 | Hoffecker et al. . |
| 5,440,686 | | 8/1995 | Dahman et al. . |
| 5,469,560 | * | 11/1995 | Beglin ............................... 711/112 |
| 5,522,090 | | 5/1996 | Tanaka et al. . |
| 5,537,585 | | 7/1996 | Blickenstaff et al. . |

OTHER PUBLICATIONS

IBM Corporation, DFSMS/MVS: System–Managed Storage and Tape Mount Management, http://www.storage.ibm.com/software/sms/tmm.htm.

Bittihoffer And Pence, Preserving Tape Mounts, IBM Technical Disclosure Bulletin, vol. 26, No. 3A, Aug. 1983.

DFSMShsm Storage Administration Guide, MVS Version 1 Release, Document No. SH21–1076–02, Program No. 5695–DF1, File No. S370–30 (selected portiosn).

* cited by examiner

Primary Examiner—Do Yoo
Assistant Examiner—Nasser Moazzami
(74) Attorney, Agent, or Firm—David W. Victor; Konrad Raynes & Victor

(57) ABSTRACT

Disclosed is a system for handling recall requests for data maintained in storage devices from a host system. The host system maintains a queue of recall requests to a plurality of storage devices. Priority data is associated with each recall request in the queue. The host system initiates a recall operation for a recall request in the queue to a first storage device mounted in a drive. The host system then determines whether a next recall request to the first storage device has a higher priority than a recall request to a second storage device not mounted in a drive. The recall operation for the next recall request to the first storage device is performed after determining that the next recall request has the higher priority. The first storage device is demounted from the drive after determining that the recall request to the second storage device has the higher priority. The second storage device to the drive is mounted after demounting the first storage device from the drive. The recall operation for the recall request to the second storage device is then performed.

28 Claims, 4 Drawing Sheets

FIG. 2

Request Data Structure 20

| Requested Operation 24 | Volume 26 | Priority Data 28 | Go-ahead Flag 30 | Go-ahead Flag Time Stamp 32 |

FIG. 3

Priority Data Structure 40

| Wait Flag 42 | Priority Value 44 | Time Stamp 46 |

FIG. 4

Recall Queue 50

| Recall Request 1 | Recall Request 2 | Recall Request 3 | Recall Request 4 |

CONTENTION HANDLING FOR TASK REQUESTS TO STORAGE DEVICES WITHIN A HOST SYSTEM

RELATED APPLICATION

This application is related to the commonly assigned and co-pending application entitled "Contention Handling for Access Requests to a Storage Device," to Jerry Pence and Cuong Minh Le, application Ser. No. 09/088,785, filed on the same date herewith, which application is incorporated herein by reference in its entirety.

BACKGROUND OF THE INVENTION

1. Field of the Invention

The present invention relates to a method and system for handling storage device requests within a host system with all allowed devices in use.

2. Description of the Related Art

In a hierarchical storage management system, data is stored in different types of storage devices depending upon the frequency of usage of the data. For instance, a system may include multiple storage media types to store data having different usage patterns and likelihoods of access. More frequently used data may be stored on direct access storage devices (DASD) comprised of high-performance rapid access storage devices, such as hard disk drives. Such readily accessible data is sometimes referred to as level zero volumes. Less frequently used data may be archived on slower and less expensive, demountable storage media, such as optical disks, magnetic tape cartridges, etc. Such archive volumes are referred to as level two storage.

A hierarchical storage management system provides mechanisms for migrating less frequently used data from level 0 to level 2 media. This provides more space for more frequently used data sets on the level 0 storage devices. If a host system attempts to access data sets maintained in level 2 storage, then software implemented in the host system would automatically cause the recall of the requested data from the level 2 to level 0 storage devices. The level 0 storage devices further store control data sets, an inventory, that the host systems utilize to access data from the storage devices.

Two common functions initiated by host systems in hierarchical storage management systems include migration and recall. Migration involves the movement of data from level 0 to level 2 storage to make more room for more frequently accessed data on the primary level 0 storage devices. If a host system attempts to access a data set that has been migrated to level 2 storage, then the recall request would be initiated to move the requested data sets from the level 2 storage to level 0.

International Business Machines Corporation (IBM®), the assignee of the subject patent application, provides the Data Facilities Storage Management Subsystem (DFSMS®) software which is included in the IBM MVS/ESA™ and OS/390® operating systems. This software allows host systems to perform hierarchical storage management operations, such as migration and recall. IBM, DFSMS, and OS/390 are registered trademarks of IBM, and MVS/ESA is a trademark of IBM. The operation and implementation of the DFSMS system are described in IBM publications "DFSMS/MVS V1R3 General Information," IBM document no. GC26-4900-04 (IBM Copyright, 1980, 1995) and "DFSMS/MVS V1R3 DFSMShsm Storage Administration Guide," IBM document no. SH21-1076-02 (IBM Copyright 1984, 1995), which publications are incorporated herein by reference in their entirety. U.S. Pat. Nos. 4,638,424 and 4,771,375, assigned to IBM and incorporated herein by reference in their entirety, describe how contentions between multiple hosts initiating migration and recall requests to the same volume are handled.

In some cases, the user specifies a maximum number of tape drives to handle recall functions. Only that many tape drives are used to handle recalls. For instance, if up to five tape drives are allowed to handle recall operations, then recall operations could be performed simultaneously with respect to five tapes. If all the tape drives allowed to handle recall requests are in use processing recall requests, then a recall request to a tape not mounted in one of the tape drives allowed to handle recall requests must wait until the host has completed processing all the queued recall requests for one of the current mounted tapes. Only after all queued recall requests have completed with respect to a mounted tape will another tape be mounted into the tape drive handling recall requests to service the pending recall requests.

The current methodology is based on a "mount optimization" approach to reduce the number of mounts by maximizing the number of recall requests processed for a mounted tape before demounting the tape to process recall requests with respect to an unmounted tape. The problem with this "mount optimization" approach is that higher priority recall requests directed toward an unmounted tape may be delayed a substantial period of time until all lower priority requests for a mounted tape are completed. With the current art, higher priority requests may be significantly delayed before a recall tape drive is made available and the lower priority requests directed toward a recall tape drive are completed.

The storage capacity of tape cartridges and other typical level 2 storage devices has increased significantly, thereby allowing an ever increasing number of data sets to be maintained on any given tape. One effect of the increase of storage capacity is that the average number of recall requests in a queue for a particular tape has increased. This in turn increases the expected delay before the tape is demounted and the tape drive made available for higher priority recall requests to unmounted tapes. Moreover, software programs that improve storage capacity utilization of tapes further increase the expected time to service a queue of recall requests for a mounted tape. For these reasons, the expected "wait time" a recall request must wait before a queue of recall requests is completed and a tape demounted has increased because the expected number of recall requests in a given queue has increased.

SUMMARY OF THE PREFERRED EMBODIMENTS

To overcome the limitations in the prior art described above, the present invention discloses a system for handling recall requests for data maintained in storage devices from a host system. The host system maintains a queue of recall requests to a plurality of storage devices. Priority data is associated with each recall request in the queue. The host system initiates a recall operation for a recall request in the queue to a first storage device mounted in a drive. The host system then determines whether a next recall request to the first storage device has a higher priority than a recall request to a second storage device not mounted in a drive. The recall operation for the next recall request to the first storage device is performed after determining that the next recall request has the higher priority. The first storage device is demounted from the drive after determining that the recall request to the second storage device has the higher priority. The second storage device to the drive is mounted after demounting the first storage device from the drive. The recall operation for the recall request to the second storage device is then performed.

Preferred embodiments provide a system for handling contentious recall requests to multiple storage devices within a host system to insure that higher priority recall requests are processed before lower priority requests. In further embodiments, higher priority requests will not be serviced for a specified period of time during which the mounted tape handles queued recall requests directed toward the current mounted tape regardless of the priority of other recall requests in the queue. In preferred embodiments, a queue of lower priority recall requests to the first storage device will be put on hold to service higher priority requests to a storage device that is not mounted. The storage device to which the higher priority recall requests are directed will then be mounted to allow execution of the higher priority requests.

BRIEF DESCRIPTION OF THE DRAWINGS

Referring now to the drawings in which like reference numbers represent corresponding parts throughout:

FIG. 2 illustrates a data structure for a recall request in accordance with preferred embodiments of the present invention;

FIG. 3 illustrates a data structure to indicate the priority of a recall request in accordance with preferred embodiments of the present invention;

FIG. 4 illustrates a data structure of a queue of recall request data structures;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
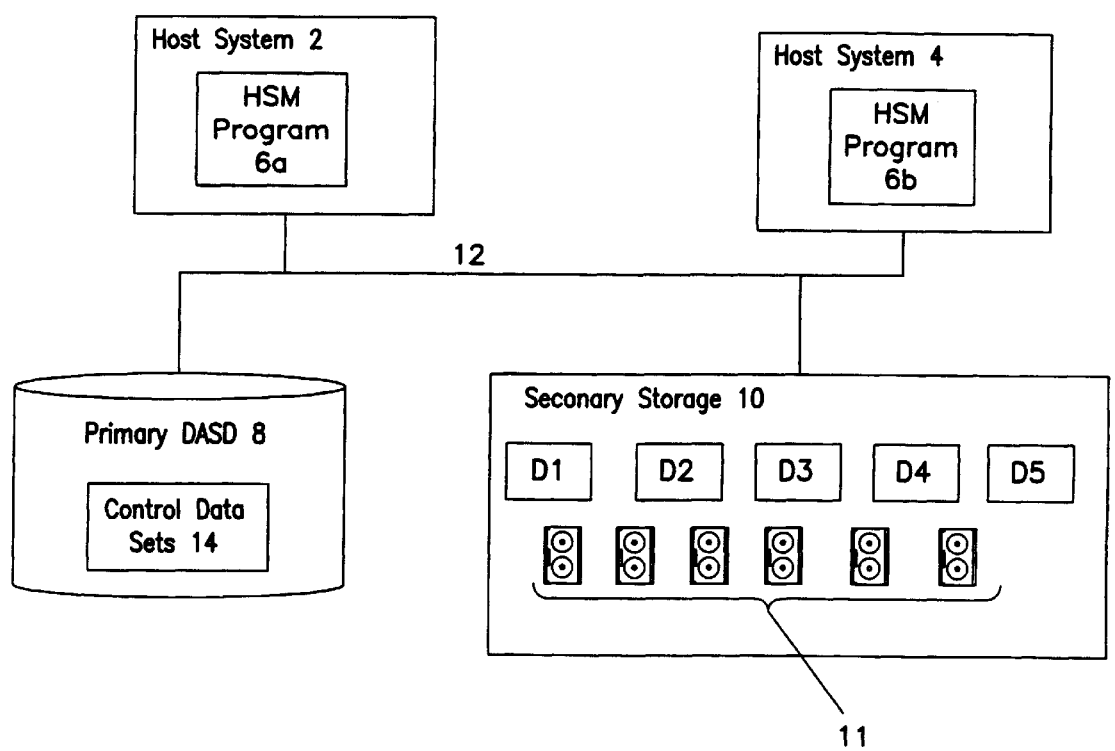
FIG. 1 is a block diagram illustrating a software and hardware environment in which preferred embodiments of the present invention are implemented.

FIG. 1 illustrates the hardware and software environment in which preferred embodiments of the present invention are implemented. Host systems 2, 4 include hierarchical storage management (HSM) programs 6a, b, respectively. A primary DASD 8 provides storage of more frequently used volumes and data sets, i.e., level 0 volumes, for access by the host systems 2, 4. In preferred embodiments, the primary DASD 8 is comprised of relatively high-performance rapid access storage devices, such as a group of hard disk drives. A secondary storage system 10 provides storage of less frequently used data, i.e., level 2 volumes. In preferred embodiments, the secondary storage 10 includes a plurality of drives D1–D5 and numerous, perhaps thousands, of storage cartridges 11 that may be loaded into the drives D1–D5. Typically, secondary storage 10 utilizes slower and less expensive storage media than that used for the primary DASD 8, e.g., optical disks, magnetic tape cartridges, etc. Typically, the secondary storage 10 archives and backs-up less frequently used data from the primary DASD 8.

In preferred embodiments, the secondary storage 10 may be comprised of an automated tape library (ATL) which includes multiple tape drives D1–D5 and numerous tape cartridges 11 that may be mounted into the tape drives automatically using a robotic arm. In such case, the ATL may include any suitable tape drives known in the art, e.g., the Magstar 3590 tape drives and Magstar cartridges; the IBM 3490E tape drive and CST and ECCST cartridges; and the IBM 3480 tape drive and cartridges, etc. Alternatively, the secondary storage 10 may be a manual tape library in which the user manually mounts tape cartridges into the secondary storage 10 tape drives.

In alternative embodiments, any alternative non-volatile storage media and systems known in the art may be used for the primary DASD 8 and secondary storage 10, including, optical disks, holographic units, DVD, CD-ROM, non-volatile RAM, etc.

Data is transferred between the host systems 2, 4 and primary DASD 8 and secondary storage 10 via a network 12. The network line 12 may be comprised of any network technology known in the art, such as LAN, WAN, SNA networks, TCP/IP, the Internet, etc.

The host systems 2, 4 may be any computer system, such as a mainframe, personal computer, workstation, etc., including an operiting system such as WINDOWS®, AIX®, UNIX®, MVS™, etc. AIX is a registered trademark of IBM; MVS is a trademark of IBM; WINDOWS is a registered trademark of Microsoft Corporation; and UNIX is a registered trademark licensed by the X/Open Company LTD. As mentioned, the host systems 2, 4 include HSM programs 6a, b that include the functionality of HSM type programs known in the art that manage the transfer of data between storage systems, such as the IBM DFSMS software discussed above, hich is implemented in the IBM MVS operating system. In addition to including known HSM functions, such as migration and recall, the HSM programs 6a, b would further include additional program instructions and logic to perform the operations of the preferred embodiments of the present invention. The HSM program 6a, b may be implemented within the operating system of the host systems 2, 4 or as separate, installed application programs.

The primary DASD 8 further stores control data sets 14 that the HSM programs 6a, b in the host systems 2, 4 access and update when accessing data sets within the primary DASD 8 and the secondary storage 10. Controlers or storage subsystems receive commands from the HSM program 6a, b in the host systems 2, 4 and perform the operations requested by the HSM programs 6a, b, such as migration and recall, to transfer data among the primary DASD 8, secondary storage 10, and the host systems 2, 4. In preferred embodiments, the storage controllers within the primary DASD 8 and secondary storage 10 can simultaneously process numerous input/output requests from the host systems 2, 4 and any other attached system directed toward the storage units 8, 10. Moreover, the HSM programs 6a, b in the host systems 2, 4 may be capable of multi-tasking, simultaneously executing numerous input/output operations, and simultaneously transmitting multiple I/O requests to the primary DASD 8 and secondary storage 10 to execute.

Recall, Request Priority, and Data Structures

A host system, e.g., host system 2, initiating a request to recall a data set from the secondary storage 10 builds a request data structure 20, illustrated in FIG. 2, to execute the requested task, e.g., recall, migration, recycling, and parameter functions needed to accomplish the requested task. In DFSMS, the request data structure is referred to as a management work element (MWE), which is the data structure the host system 2 generates to execute a specific request, such as recall.

This request data structure 20 may include the following information fields: a requested operation field 24 indicating the operation to be performed, e.g., recall, migration, etc.; a volume field 26 indicating the volume subject to the operation identified in field 24; priority data 28 indicating the priority of the request; a "go-ahead" flag 30; and a time stamp field 32. The "go-ahead" flag 30, and time stamp field 32 are described in co-pending and commonly assigned patent application "Contention Handling for Access Requests to a Storage Device," application Ser. No. 09/088,785, which application was incorporated herein by reference in its entirety above. In preferred embodiments, the request data structure 20 is used locally by the host system to manage and execute the requested task.

FIG. 3 illustrates a preferred embodiment of a priority data structure 40, which includes data fields indicating a priority of a task initiated by the host system 2. The priority data structure 40 of FIG. 3 may be the priority data 28 maintained in the request data structure 20. The host system 2 generates the priority data structure 40 when generating a recall request to a volume indicating the priority of the data set subject to the recall. A wait flag 42 field indicates whether the application originating the request needs the recalled data to proceed. In preferred embodiments, the wait flag 42 field is comprised of a bit location. A binary zero may indicate that the request is "no wait" and a binary one may indicate the request is "wait." "Wait" means that the requesting application needs the requested data before proceeding with program execution, i.e., the application must wait for the data. "No wait" means the application does not need the data to proceed and can receive the data at some later time, i.e., it does not have to wait.

A priority value field 44 may indicate a priority value, such as a number from 1–100, indicating the priority of the recall request. For instance, a database application program request for data may have a very high priority, whereas a batch processing task requesting data may have a lower priority, and request from users may have an even lower priority. The user may program priority values based on the source of the request, e.g., database, batch job or user request. A time stamp field 46 indicates the time at which the recall request was initiated. In preferred embodiments, the HSM programs 6a, b generate the priority data included in the priority data structure 40. The different fields 42, 44, 46 in the priority data structure 40 may have different priority. For instance, the priority value 44 and time stamp 46 fields may only be checked if the wait flag 42 field for compared data structures 40 are the same. Likewise, the time stamp 46 field may only be compared if the wait flag 42 and priority value 44 for compared priority data structures 40 are identical.

In this way, the priority data structure 40 provides multiple levels of information describing the relative priority of a request according to different criteria. In alternative embodiments, the priority data structure may include additional or fewer fields than the data structure 20 shown in FIG. 2.

FIG. 4 illustrates a queue of recall requests a host 2, 4 builds. A host 2, 4 may be processing a plurality of recall requests to tapes loaded in the tape drives dedicated to recall operations. When the host system 2 receives or generates another recall request, that new recall request is placed in the recall queue 50. The new recall request may be directed toward a volume on a storage device currently mounted in a drive or in a storage device not mounted. In preferred embodiments, a predetermined number of drives D1–D5 are allowed to handle recall requests. A host system 2 performing recalls may be multi-tasking recall requests to tapes in each of the recall tape drives. If the host system 2 receives a recall request toward a storage device 11 that is not mounted, that request too is placed in the recall queue 50. The recall queue 50 thus consists of multiple request data structures for different requests.

In preferred embodiments, the host system 2 orders recall requests in the queue according to their priority, as indicated in the priority data structure 40. The host system 2 may perform recall requests for a storage cartridge loaded in a drive for a specified time before the host system 2 will demount the tape to make the tape available for recall requests of higher priority to storage cartridges not mounted in a drive D1–D5.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Contention Handling for Recall Requests Among Multiple Hosts

Figure 5:
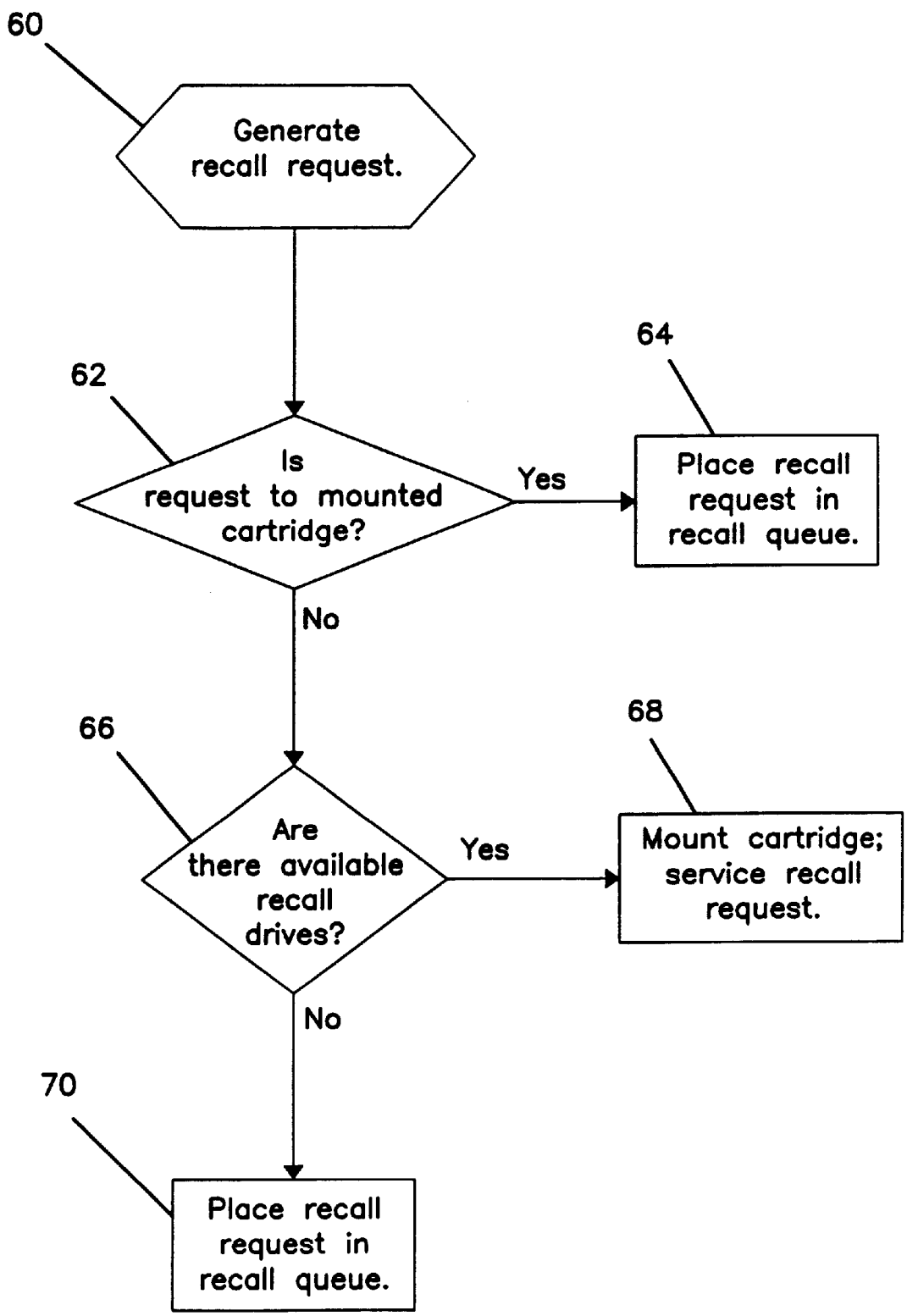
FIG. 5 is a flowchart showing logic for a host system that is using the storage device for recall requests in accordance with preferred embodiments of the present invention.
Figure 6:
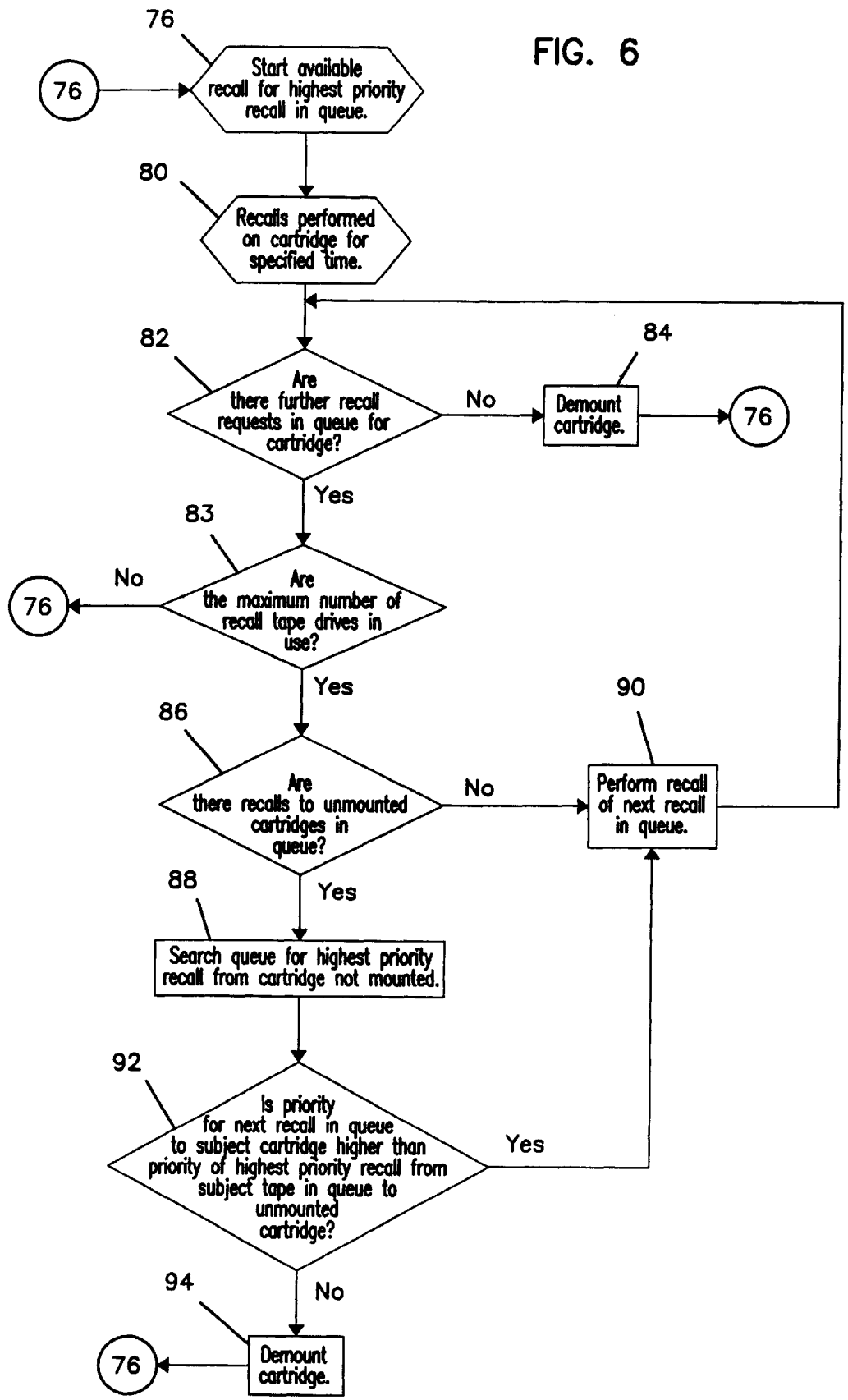
FIG. 6 is a flowchart showing logic for a host system to process recall requests in accordance with preferred embodiments of the present invention.

FIGS. 5 and 6 are flowcharts that illustrate preferred logic implemented in the software of the HSM programs 6a, b to handle contentions of multiple recall requests for a single host 2, 4. Those skilled in the art will recognize that this logic is provided for illustrative purposes only and that different logic may be used to accomplish the same results.

FIG. 5 illustrates logic implemented in a host system to handle a recall request. Control begins at block 60 which represents a host system, e.g., host system 2, generating or receiving a recall request to a volume on one of the storage cartridges, i.e., storage devices 11. Control transfers to block 62 which represents the host system 2 determining whether the recall request is to a volume on a mounted cartridge to which the host system 2 is currently performing recall operations. If so, control transfers to block 64 which represents the host 2 placing the recall request in the recall queue 50. If the recall request is to an unmounted cartridge that is not involved in recall operations with another host system, e.g., host 4, then control transfers to block 66 which represents the host system 2 determining whether there are any available recall drives. If so, control transfers to block 68 which represents the host system 2 mounting the cartridge into the drive and performing the recall request to that mounted drive. If there are no available recall drives, then the host system 2 places the recall request in the queue 50.

The logic of FIG. 5 does not describe how to handle a recall request to a cartridge involved in recall operations from another host system. This situation is described in the co-pending and commonly assigned patent application "Contention Handling for Access Requests to a Storage Device," application Ser. No. 09/088,785, which application was incorporated herein by reference in its entirety above.

FIG. 6 illustrates logic implemented in the host systems 2, 4 to service recall requests in a queue of recall requests to mounted and unmounted cartridges. Control begins at block 76 which represents the host system 2 initiating an available recall for the highest priority request in the queue. In preferred embodiments, additional recalls for the mounted tape are started independent of priority until a predetermined time for processing recall requests for the mounted tape has lapsed. Control transfers to block 80 which represents the host system 2 performing recall requests with respect to a particular storage cartridge for a specified period of time. As discussed, in preferred embodiments, recall requests are performed for such specified period of time, irregardless of whether there are higher priority recall requests in the recall queue 50 to unmounted storage cartridges.

Control transfers to block 82 which is a decision block representing the host system 2 determining whether there are further recall requests in the queue for the cartridge. If no, then control transfers to block 84 which represents the host system 2 issuing a command to demount the cartridge. From block 84 control transfers back to block 76 to process any received recall requests. If there are further recall requests at block 82, then control transfers to block 83 which represents the host system 2 determining whether the maximum number of tape drives allowed to handle recall requests are in use. If all the tape drives that handle recall requests are in use, control transfers to block 86; otherwise, control transfers back to block 76 to process the next highest priority recall request in the queue directed toward the mounted tape.

At block 86, the host system searches the queue 50 to determine whether there are any recall requests to unmounted cartridges. In preferred embodiments, the host system only performs the step of searching the queue 50 at block 86 if the time for processing recall requests for the tape has lapsed and if the maximum number of tape drives allowed to handle recall requests are not in use. If so, control transfers to block 88; otherwise, control transfers to block 90. If there are no recall requests to unmounted cartridges, then at block 90 the host system 2 performs the next recall request in the recall queue 50 for the current mounted cartridge. As discussed, the host system 2 performs recall requests in the queue for a given cartridge in order of the priority of the requests as indicated by the priority data 28 for the queued recall requests. Control then transfers back to block 82 to process the next recall request.

If there are recall requests to unmounted cartridges in the recall queue 50, then at block 88, the host system 2 searches the recall queue 50 for the highest priority recall to an unmounted cartridge. Control then transfers to block 92 which represents the host system 2 determining whether the priority of the next recall in the queue for the mounted cartridge is higher than the priority of the located highest priority recall for an unmounted cartridge. If so, control transfers back to block 90 to perform the recall operation on the next recall request in the queue for the mounted cartridge. Otherwise, control transfers to block 94 to demount the cartridge. As discussed, when the priority data includes the fields described in FIG. 3, the host system 2 would first compare the wait flag fields 42. If the wait flag 42 was the same for the next recall to the mounted cartridge and the highest priority recall to an unmounted cartridge, then the host system 2 would compare the priority value 44. If the priority values 44 are identical, then the host system 2 would compare the time stamp 46 priority value.

After demounting the cartridge at block 94, control transfers to block 96 to mount the cartridge for the highest priority recall request in the queue 50 to a tape drive D1–D5 available for recall requests to service this highest priority recall request. In preferred embodiments, the host system 2 would process recall requests to the just mounted cartridge for the specified period of time before performing the logic of FIG. 6 to determine if any recall requests to unmounted cartridges in the queue 50 should be handled before proceeding to recall requests to the mounted cartridge.

CONCLUSION

This concludes the description of the preferred embodiments of the invention. The following describes some alternative embodiments for accomplishing the present invention.

In preferred embodiments, specific data structures, such as the request data structure, priority data structure, and recall queue were described as being generated by the HSM programs 6a, b within the host systems 2, 4. In alternative embodiments, these records could be generated by different processing units, such as storage subsystems managing the primary DASD 8 and secondary storage 10 or any other processing unit. Moreover, these data structures could include additional or fewer fields than shown in the preferred embodiments.

The logic of FIGS. 5 and 6 and other embodiments were described with respect to recall requests to a tape cartridge. However, those skilled in the art will appreciate that the preferred logic could apply to any type of non-volatile storage medium from which data is recalled.

Preferred embodiments were described as being implemented in logic within HSM programs 6a, b. In alternative embodiments, functions described as being performed by the HSM programs 6a, b may be performed by logic within storage subsystems managing the primary DASD 8 and/or secondary storage 10.

In summary, preferred embodiments in accordance with the present invention disclose a system for handling recall requests for data maintained in storage devices from a host system. The host system maintains a queue of recall requests to a plurality of storage devices. Priority data is associated with each recall request in the queue. The host system initiates a recall operation for a recall request in the queue to a first storage device mounted in a drive. The host system then determines whether a next recall request to the first storage device has a higher priority than a recall request to a second storage device not mounted in a drive. The recall operation for the next recall request to the first storage device is performed after determining that the next recall request has the higher priority. The first storage device is demounted from the drive after determining that the recall request to the second storage device has the higher priority. The second storage device to the drive is mounted after demounting the first storage device from the drive. The recall operation for the recall request to the second storage device is then performed.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for handling recall requests for data maintained in a storage device from a host system, comprising the steps of:
providing a queue of recall requests to a plurality of storage devices, wherein priority data is associated with each recall request in the queue;
performing a recall operation for a recall request in the queue to a first storage device mounted in a drive;
determining with the host system whether a next recall request to the first storage device has a higher priority than a recall request to a second storage device not mounted in the drive after performing the recall operation;
performing the recall operation for the next recall request to the first storage device after determining that the next recall request has the higher priority;
demounting the first storage device from the drive after determining that the recall request to the second storage device has the higher priority;
mounting the second storage device to the drive after demounting the first storage device from the drive; and
performing the recall operation for the recall request to the second storage device.

2. The method of claim 1, wherein the step of determining whether the next recall request to the first storage device has the higher priority, comprises the steps of:
searching with the host system the queue to locate a highest priority recall request to a storage device not mounted in a drive as indicated from the priority data associated with each recall request, wherein the located highest priority recall request is to the unmounted second storage device; and
determining whether the next recall request to the first storage device has higher priority than the highest priority recall request to the unmounted storage device by processing the priority data.

3. The method of claim 2, wherein the next recall request to the first storage device is determined by processing, with the host system, the priority data of recall requests to the first storage device in the queue to locate a highest priority recall request to the first storage device.

4. The method of claim 1, wherein the recall operations in the queue are performed with respect to the first storage device for a predetermined period of time, and wherein the step of determining the higher priority occurs after performing the recall operations to the first storage device for the predetermined period of time.

5. The method of claim 1, wherein a plurality of drives service recall operations, and wherein the step of providing the queue of recall requests comprises the steps of:
providing an unqueued recall request not in the queue;
determining whether the unqueued recall request is to a storage device mounted in one of the drives;
including the unqueued recall request in the queue after determining that the storage device for the unqueued recall request is mounted in one of the drives;
determining whether all the drives servicing recall operations are in use; and
including the unqueued recall request in the queue after determining that the storage device for the unqueued recall request is not mounted in one of the drives and all the drives are in use.

6. The method of claim 5, further comprising the step of mounting the storage device for the unqueued recall request in one of the drives after determining that all the drives servicing recall requests are not in use.

7. The method of claim 1, wherein the priority data includes a wait flag indicating whether an application program requesting the data that is the subject of the recall request needs the data in order to proceed, a priority value indicating a priority of the application program requesting the data, and a time stamp indicating when the recall request for the data was attempted, wherein the step of determining whether the priority data of the next recall request is higher than the priority data of the recall request to the second storage device comprises the steps of determining whether the priority of the wait flag, priority value, and time stamp of the next recall request is higher than that of the priority associated with the recall request to the second storage device.

8. A system for handling recall requests for data, comprising:
a host system;
a first and second storage devices;
a drive capable of receiving the first and second storage devices;
a transmission line providing communication between the host system and the drive, wherein the host system accesses the storage devices through the drive;
a memory location storing data structures for access and execution by the host system, comprising:
(i) a queue data structure including a plurality of recall requests to the first storage device and priority data associated with each recall request, wherein the host system processes a recall request in the queue data structure to recall data from the one of the first and second storage devices mounted in the drive;
(ii) a recall request data structure including a recall request to the second storage device and priority data, wherein the host system determines whether the priority data for a next recall request to the first storage device in the queue data structure has a higher priority than the priority data for the recall request to the second storage device, wherein the host system processes the next recall request to the first storage device alter determining that the next recall request has the higher priority, and wherein, after determining that the recall request to the second storage device has the higher priority, the host system demounts the first storage device from the drive, mounts the second storage device to the drive, and performs the recall operation for the recall request to the second storage device.

9. The system of claim 8, further including program logic for searching the queue to locate a highest priority recall request to the unmounted second storage device as indicated from the priority data and determining whether the next recall request to the first storage device has higher priority than the highest priority recall request to the unmounted second storage device by processing the priority data.

10. The system of claim 9, further including program logic for determining the next recall request to the first storage device by processing the priority data of recall requests to the first storage device in the queue data structure to locate a highest priority recall request to the first storage device.

11. The system of claim 8, further including program logic for executing recall requests in the queue data structure for a predetermined period of time and determining the higher priority after performing the recall operations to the first storage device for the predetermined period of time.

12. The system of claim 8, further including:
a plurality of drives servicing recall operations;
means for providing an unqueued recall request not in the queue;
means for determining whether the unqueued recall request is to a storage device mounted in one of the drives;
means for including the unqueued recall request in the queue after determining that the storage device for the unqueued recall request is mounted in one of the drives;
means for determining whether all the drives servicing recall operations are in use; and
means for including the unqueued recall request in the queue after determining that the storage device for the unqueued recall request is not mounted in one of the drives and all the drives are in use.

13. The system of claim 12, wherein the program logic further generates a command to mount the storage device for the unqueued recall request in one of the drives after determining that all the drives servicing recall requests are not in use.

14. The system of claim 8, wherein the priority data includes a wait flag indicating whether an application program requesting the data that is the subject of the recall request needs the data in order to proceed, a priority value indicating a priority of the application program requesting the data, and a time stamp indicating when the recall request for the data was attempted, wherein the step of determining whether the priority data of the next recall request is higher than the priority data of the recall request to the second storage device comprises; the steps of determining whether the priority of the wait flag, priority value, and time stamp of the next recall request is higher than that of the priority associated with the recall request to the second storage device.

15. An article of manufacture for use in programming a host system to process recall requests directed to a storage device, the article of manufacture comprising at least one computer readable storage device including at least one computer program embedded therein that causes the host systems to perform the steps of:
providing a queue of recall requests to a plurality of storage devices, wherein priority data is associated with each recall request in the queue;
performing a recall operation for a recall request in the queue to a first storage device mounted in a drive;
determining with the host system whether a next recall request to the first storage device has a higher priority than a recall request to a second storage device not mounted in the drive after performing the recall operation;
performing the recall operation for the next recall request to the first storage device after determining that the next recall request has the higher priority;
demounting the first storage device from the drive after determining that the recall request to the second storage device has the higher priority;
mounting the second storage device to the drive after demounting the first storage device from the drive; and
performing the recall operation for the recall request to the second storage device.

16. The article of manufacture of claim 15, wherein the step of determining whether the next recall request to the first storage device has the higher priority, comprises the steps of:
searching with the host system the queue to locate a highest priority recall request to a storage device not mounted in a drive as indicated from the priority data associated with each recall request, wherein the located highest priority recall request is to the unmounted second storage device; and
determining whether the next recall request to the first storage device has higher priority than the highest priority recall request to the unmounted second storage device by processing the priority data.

17. The article of manufacture of claim 16, wherein the next recall request to the first storage device is determined by processing, with the host system, the priority data of recall requests to the first storage device in the queue to locate a highest priority recall request to the first storage device.

18. The article of manufacture of claim 15, wherein the recall operations in the queue are performed with respect to the first storage device for a predetermined period of time, and wherein the step of determining the higher priority occurs after performing the recall operations to the first storage device for the predetermined period of time.

19. The article of manufacture of claim 15, wherein a plurality of drives are servicing recall operations, and wherein the step of providing the queue of recall requests comprises the steps of:
providing an unqueued recall request not in the queue;
determining whether the unqueued recall request is to a storage device mounted in one of the drives;
including the unqueued recall request in the queue after determining that the storage device for the unqueued recall request is mounted in one of the drives;
determining whether all the drives servicing recall operations are in use; and
including the unqueued recall request in the queue after determining that the storage device for the unqueued recall request is not mounted in one of the drives and all the drives are in use.

20. The article of manufacture of claim 19, further comprising the step of mounting the storage device for the unqueued recall request in one of the drives after determining that all the drives servicing recall requests are not in use.

21. The article of manufacture of claim 15, wherein the priority data includes a wait flag indicating whether an application program requesting the data that is the subject of the recall request needs the data in order to proceed, a priority value indicating a priority of the application program requesting the data, and a time stamp indicating when the recall request for the data was attempted, wherein the step of determining whether the priority data of the next recall request is higher than the priority data of the recall request to the second storage device comprises the steps of determining whether the priority of the wait flag, priority value, and time stamp of the next recall request is higher than that of the priority associated with the recall request to the second storage device.

22. A memory location for storing data structures for access by a host system, wherein the host system is in communication with a drive, wherein a first storage device and a second storage device are capable of being mounted in the drive, wherein the host system can perform data access operations on one of the first and second storage devices when mounted in the drive, the data structures comprising:

a queue data structure including a plurality of recall requests to a first storage device and priority data associated with each recall request, wherein the host system processes a recall request in the queue data structure to recall data from one of the first and second storage devices;

a recall request data structure including a recall request to the second storage device and priority data, wherein the host system determines whether the priority data for a next recall request to the first storage device in the queue data structure has a higher priority than the priority data for the recall request to the second storage device, wherein the host system processes the next recall request to the first storage device after determining that the next recall request has the higher priority, and wherein, after determining that the recall request to the second storage device has the higher priority, the host system demounts the first storage device from the drive, mounts the second storage device to the drive, and performs the recall operation for the recall request to the second storage device.

23. The memory of claim 22, wherein the host system searches the queue data structure to locate a highest priority recall request to the unmounted second storage device as indicated from the priority data and determining whether the next recall request to the first storage device has higher priority than the highest priority recall request to the unmounted second storage device by processing the priority data.

24. The memory of claim 23, wherein the host system processes the recall request data structure to determine the next recall request to the first storage device by processing the priority data of recall requests to the first storage device in the queue data structure to locate a highest priority recall request to the first storage device.

25. The memory of claim 22, wherein the host system processes recall requests in the queue data structure for a predetermined period of time and determines the higher priority after performing the recall operations to the first storage device for the predetermined period of time.

26. The memory of claim 22, wherein a plurality of drives are allocated to recall operations, wherein the host system inserts a received recall request into the queue data structure after determining that the recall request is directed toward data in a storage device mounted in one of the drives.

27. The memory of claim 26, wherein the host system inserts the received recall request into the queue data structure after determining that the storage device for the received recall request is not mounted in one of the drives and all the drives are in use.

28. The memory of claim 22, wherein the priority data for the recall requests in the queue data structure includes a wait flag indicating whether an application program requesting the data that is the subject of the recall request needs the data in order to proceed, a priority value indicating a priority of the application program requesting the data, and a time stamp indicating when the recall request for the data was attempted, wherein the step of determining whether the priority data of the next recall request is higher than the priority data of the recall request to the second storage device comprises the steps of determining whether the priority of the wait flag, priority value, and time stamp of the next recall request is higher than that of the priority associated with the recall request to the second storage device.

* * * * *

UNITED STATES PATENT AND TRADEMARK OFFICE
CERTIFICATE OF CORRECTION

PATENT NO.   : 6,279,074 B1
DATED        : July 21, 2001
INVENTOR(S)  : Jerry Wayne Pence It is certified that error appears in the above-identified patent and that said Letters Patent is hereby corrected as shown below:

Column 10,
Line 51, delete "alter" and insert -- after --

Column 11,
Line 40, delete the semicolon after "comprises"

Signed and Sealed this

Twenty-seventh Day of July, 2004

JON W. DUDAS
*Acting Director of the United States Patent and Trademark Office*